United States Patent [19]

Bosler

[11] Patent Number: 5,281,290
[45] Date of Patent: Jan. 25, 1994

[54] TRANSFER METHOD OF PRINTING

[76] Inventor: Kenneth Bosler, 82 Mulberry Dr., Holland, Pa. 18966

[21] Appl. No.: 886,027

[22] Filed: May 20, 1992

[51] Int. Cl.⁵ .............................................. B29C 47/06
[52] U.S. Cl. ................................... 156/230; 156/231; 156/232; 156/244.11; 156/244.16; 156/244.24; 156/244.27; 156/246; 156/249
[58] Field of Search ........... 156/230, 231, 238, 244.11, 156/244.16, 244.24, 244.27, 232, 246, 249, 277

[56] References Cited

U.S. PATENT DOCUMENTS

| | | | |
|---|---|---|---|
| 2,255,953 | 9/1941 | Vergobbi | 156/238 |
| 2,404,073 | 7/1946 | Karfiol et al. | 156/244.16 |
| 2,477,300 | 7/1949 | Karfiol et al. | 156/244.16 |
| 2,521,992 | 9/1950 | Nielsen | 156/238 |
| 2,559,649 | 7/1951 | Little, et al. | 156/243 |
| 3,010,861 | 11/1961 | Reese | 156/238 |
| 3,620,872 | 11/1971 | Whitechurch | 156/244.16 |
| 3,630,802 | 12/1971 | Dettling | 156/231 |
| 3,785,895 | 1/1974 | Ettre et al. | 156/238 |
| 3,892,078 | 7/1975 | Closson | 156/244.16 |
| 4,288,275 | 9/1981 | Davis | 156/238 |
| 4,423,106 | 12/1983 | Mahn | 428/207 |
| 4,462,852 | 7/1985 | Custer | 156/244.16 |
| 4,715,912 | 12/1987 | Tillotson | 156/79 |

FOREIGN PATENT DOCUMENTS 16823  5/1980  Japan ............................ 156/244.16

*Primary Examiner*—Caleb Weston
*Attorney, Agent, or Firm*—Mathews, Woodbridge & Collins

[57] ABSTRACT

An apparatus and method is provided for forming a textured pattern on a heated substrate. An extruder forms the heated substrate. A textured pattern is applied to a transfer sheet by rotary screening. Thereafter, contact is made between the textured pattern and the substrate for adhering the textured pattern to the substrate. Since the textured pattern has a greater affinity for the substrate than for the transfer sheet, the transfer sheet can be removed from the textured pattern adhered to the substrate. In a preferred application, the textured pattern formed on the substrate can be used as a vertical, horizontal or venetian blind.

10 Claims, 3 Drawing Sheets

TRANSFER METHOD OF PRINTING

BACKGROUND OF THE INVENTION

1. Field of the Invention

The present invention relates to an apparatus and method for forming a textured pattern on a substrate such as a vertical blind.

2. Description of the Related Art

There are presently known in the art various methods of forming a coated substrate. Manufacturers of articles such as textiles, photographs, furniture and carpet backing have transferred various coatings to the articles for improving wear. In addition, manufacturers of vertical blinds and venetian blinds have embossed blinds with mechanical methods. However, these methods have the disadvantage of stressing the blind. This stress of the blind causes undesired twisting and other disfigurements of the blind. The problem of providing a method for embossing vertical blinds without stressing the blinds has persisted in the manufacturing industry.

U.S. Pat. No. 2,559,649 describes a process and apparatus for forming transfer coatings. Thermoplastic films are formed on a temporary support. A sheet material is brought into contact with the temporary support. Upon the application of heat and pressure, the film adheres to the sheet material. Thereafter, the sheet and film adhered thereto are stripped from the support.

U.S. Pat. No. 3,630,802 describes a process for producing a coated substrate. A solid mass of an organic composition is pressed against a moving metal carrier. Thereafter, the carrier is heated. A coating of the organic composition forms on the carrier. A substrate is applied to the coating deposited on the carrier with sufficient pressure to adhere the coating to the substrate. After the coating is applied to the substrate, the coated substrate is removed from the carrier.

Of possible general relevance are U.S. Pat. Nos. 4,715,912 and 4,423,106 which relate to methods for producing a laminated product.

The present invention provides a novel assembly for forming a textured coating on a substrate such as vertical blind.

SUMMARY OF THE INVENTION

Briefly described, this present invention comprises an apparatus and method for coating a substrate with a textured pattern. A printed dimensional pattern is applied to a transfer sheet. A substrate contacts the printed pattern. In a preferred embodiment, the transfer sheet contacts the substrate between a pair of rollers. The printed pattern has a greater affinity for the substrate than the transfer sheet and is transferred from the transfer sheet to the substrate. The transfer sheet is subsequently pulled off of the printed pattern applied to the substrate.

The substrate is preferably an extrudate with a width of between 0.5 and 5.0 inches. Preferably, the printed pattern is raised or textured. In a preferred application, the printed substrate is used for vertical, horizontal or venetian blinds.

The invention will be further understood by reference to the following drawings.

DETAILED DESCRIPTION OF THE PREFERRED EMBODIMENT

Figure 1:
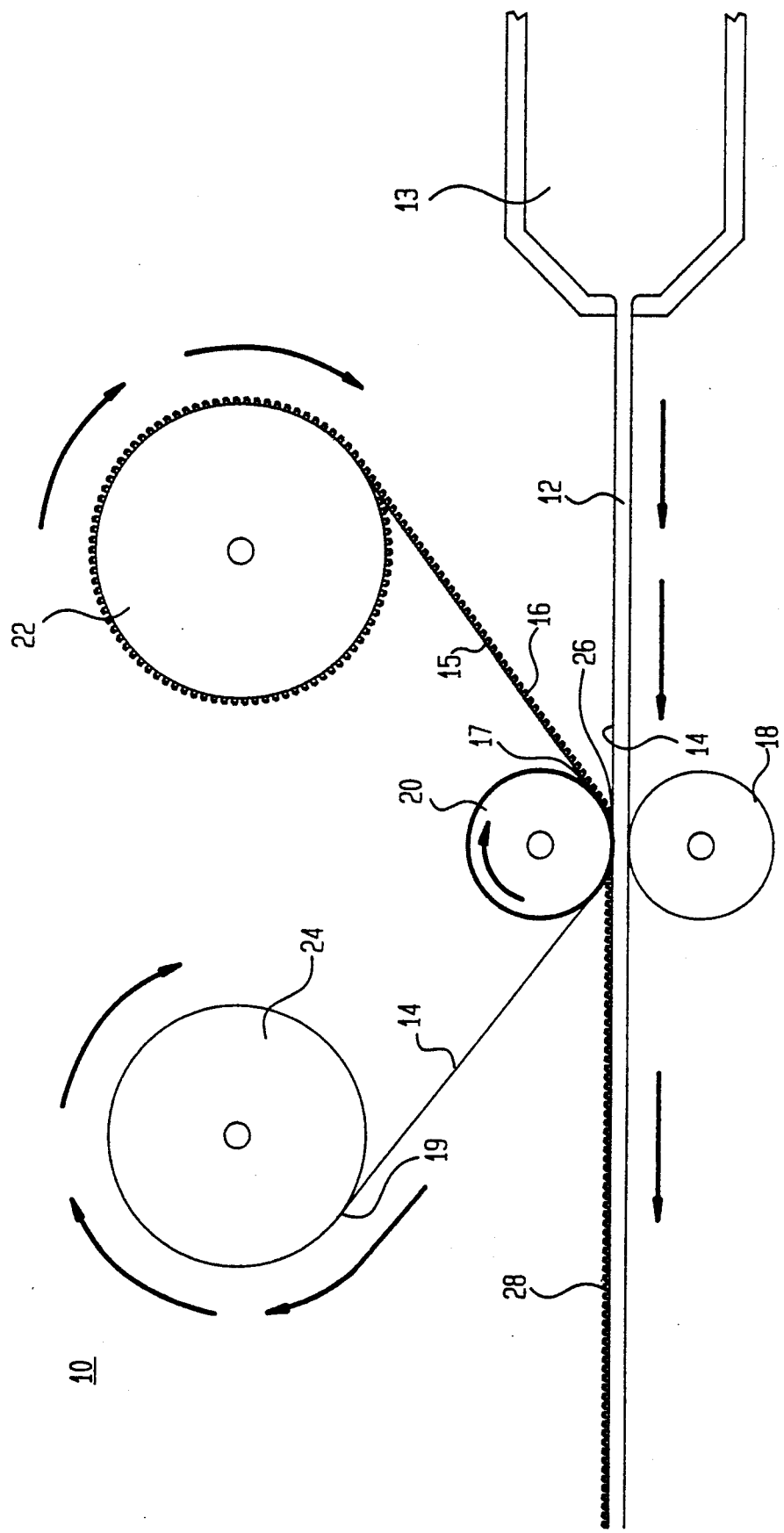
FIG. 1 is a side elevational view of a preferred embodiment of the invention.

During the course of the description like numbers will be used to identify like elements according to the different views which illustrate the invention. FIG. 1 illustrates a side elevational view of printing system 10 for embossing a substrate 12.

Upper surface 14 of substrate 12 is printed by the printing system 10. A preferred substrate 12 is a thermoplastic extrudate. The extrudate is produced by an extruder 13. Most preferably substrate 12 is made of polyvinyl chloride or polyethylene. Typically, substrate 12 is extruded at temperature in the range of about 250° F. to about 450° F.

Substrate 12 has a preferred width of between about 0.5 and 5.0 inches. Most preferably the width of substrate 12 is about 3.5 inches. It will be appreciated that the dimensions of the substrate can vary depending on the application of the substrate.

Printed pattern 16 is applied to transfer sheet 15. Preferably printed pattern 16 is raised or textured. In a preferred embodiment, printed pattern 16 is applied to transfer sheet 15 by a rotary screen process. Rotary screen processes are known in the art. It will be appreciated by those skilled in the art that other processes for applying a printed pattern can be used.

Printed pattern 16 preferably has a thickness of between 5 to 10 mm. Printed pattern 16 is preferably rubber, plastic or a thermosetting material. Printed pattern 16 can also be formed of an expandable material for providing a thicker or greater depth pattern. A preferred expandable material can be expanded after application to substrate 12 to a thickness of at least two times the original thickness of the textured pattern. It will be understood by those of ordinary skill in the art that various colors can be added to printed pattern 16 as desired.

Transfer sheet 15 is made of a composition which will release the applied printed pattern 16 upon application of pressure. A preferred transfer sheet 15 is silicone paper, mylar polyester or quilan.

Transfer sheet 15 with the applied printed pattern 16 is wrapped around the outside of roller 22. An end 17 of the transfer sheet is fed around the outside of roller 20. Preferably, roller 20 is made of rubber to provide traction of the transfer sheet with the roller. After transfer of the printed pattern 16 to substrate 12, end 19 of transfer sheet 14 is wrapped around roller 24.

Roller 18 is aligned adjacent roller 20. Substrate 12 is fed from extruder 13 to the outside of roller 18. Rollers 18 and 20 are positioned a distance apart such that printed pattern 16 contacts substrate 12 at transfer point 26 located between rollers 18 and 20. The transfer point is the point at which substrate 12 contacts printed pattern 16. Rollers 18, 20, 22 and 24 are rotated during the transfer process at an appropriate speed.

Figure 2:
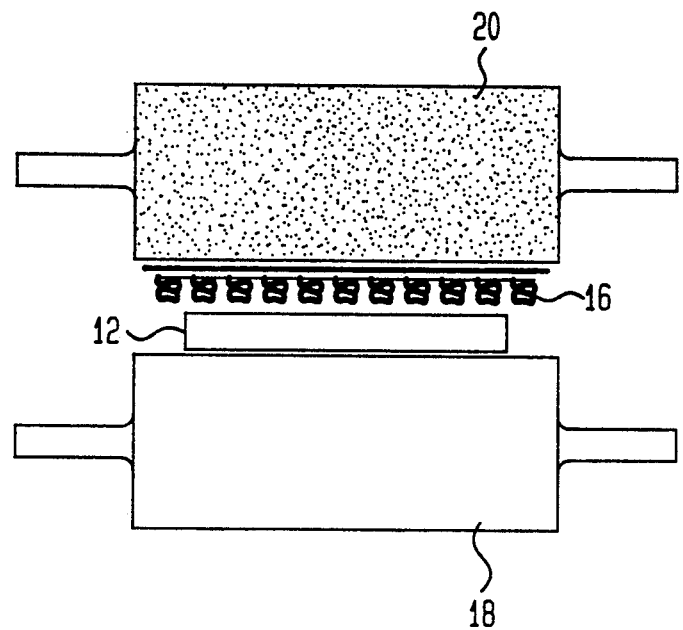
FIG. 2 is a front cross sectional view of the substrate and transfer sheet before transfer of the pattern to the substrate.
Figure 3:
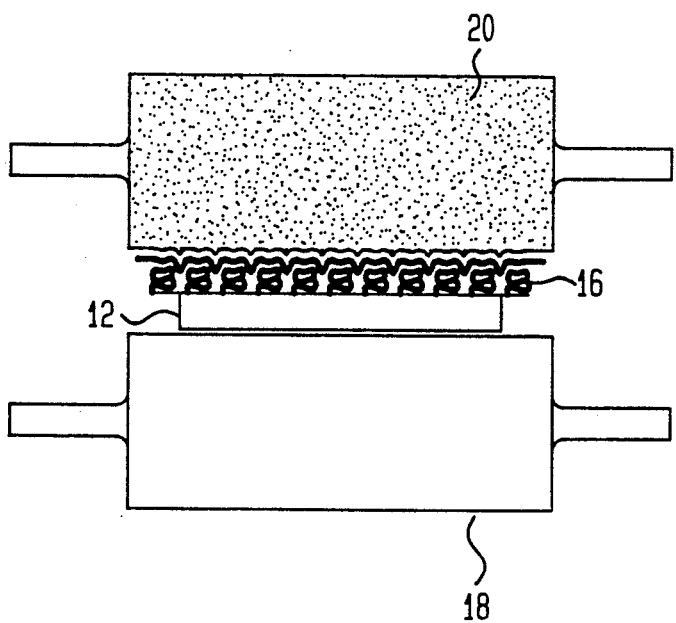
FIG. 3 is a front elevational view of the substrate and the transfer sheet after transfer of the pattern to the substrate.

FIGS. 2 and 3 illustrate a respective front view of transfer sheet 14 and substrate 12 before and after printed pattern 16 is transferred from transfer sheet 14 to substrate 12. At the transfer point 26, printed pattern 16 adheres to substrate 12. Substrate 12 provides latent heat to transfer point 26. Preferably, pressure is applied between rollers 18 and 20 against the respective substrate 12 or transfer sheet 14 for aiding in the transfer of printed pattern 16. Printed pattern 16 has a greater affinity for substrate 12 than transfer sheet 14 and releases from transfer sheet 14 to form printed substrate.

Figure 4:
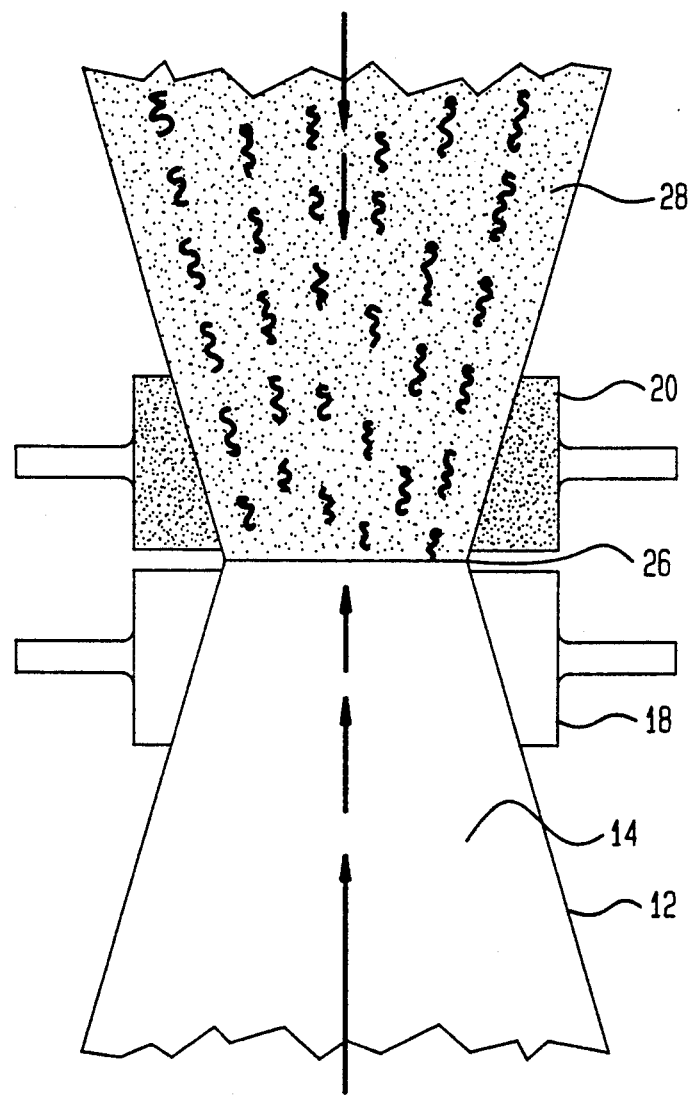
FIG. 4 is an end cross-sectional view of the rollers in a direction from the extruder during transfer of the pattern to the substrate.

FIG. 4 illustrates a perspective cross-sectional view from the extruder at the transfer point. In a first embodiment, printed pattern 16 is applied to the substrate 12 as it is being formed by extruder 13. In a second embodiment, printed pattern 16 is applied to a previously formed substrate 12. In a third embodiment, a calender is used to form a substrate 12. It will be appreciated from the above teachings that other methods can be used for forming substrate 12.

After printed pattern 16 adheres to substrate 12, transfer sheet 14 is removed from printed pattern 16 by roller 24. Transfer sheet 14 is wrapped around roller 24. The roll of the transfer sheet can be re-used in a subsequent application.

Substrate 12 with applied printed pattern 16 can be severed into sections of between about 3.0 and 8.0 feet in length. In a preferred application, the severed sections of substrate 12 are used for vertical, horizontal or venetian blinds.

While the invention has been described with reference to the preferred embodiment, this description is not intended to be limiting. It will be appreciated by those of ordinary skill in the art that modifications may be made without departing from the spirit and scope of the invention.

I claim:

1. A method for forming a textured pattern on a blind comprising the steps of:
    applying said textured pattern to a releasable transfer sheet by rotary screening, said transfer sheet being substantially flat, said textured pattern having a thickness between 5 and 10 mm;
    presenting a heated blind to said textured pattern;
    contacting said heated blind with said textured pattern for causing said textured pattern to adhere to said blind; and
    releasing said transfer sheet from said textured pattern adhered to said blind,
    wherein said pattern has a greater affinity for said blind than for said transfer sheet.

2. The method of claim 1 wherein said heated blind is formed by an extruder.

3. The method of claim 2 wherein said blind is heated to a temperature of at least 270° F.

4. The method of claim 3 wherein said blind is formed of a material chosen from the group of thermoplastic, polyvinyl chloride and polyethylene.

5. The method of claim 4 wherein said transfer sheet is chosen from the group comprising silicone release paper, quilan, release paper and polyester.

6. The method of claim 5 said blind has a width of between about 0.5 and 5.0 inches.

7. The method of claim 6 wherein said textured pattern is formed of thermosetting material.

8. The method of claim 6 wherein said textured pattern is formed of rubber.

9. The method of claim 6 wherein said textured pattern is formed of an expandable material.

10. The method of claim 6 wherein said textured pattern is formed of plastic.

* * * * *